(12) United States Patent
Morita et al.

(10) Patent No.: US 9,694,704 B2
(45) Date of Patent: Jul. 4, 2017

(54) ELECTRICAL CHARGING/DISCHARGING CONTROLLER, CHARGING CONTROL METHOD, DISCHARGING CONTROL METHOD, AND PROGRAM

(71) Applicant: MITSUBISHI HEAVY INDUSTRIES, LTD., Tokyo (JP)

(72) Inventors: Katsuaki Morita, Tokyo (JP); Shunsuke Kamei, Tokyo (JP); Takayuki Kono, Tokyo (JP); Kazuyuki Wakasugi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 448 days.

(21) Appl. No.: 14/375,258

(22) PCT Filed: Feb. 1, 2013

(86) PCT No.: PCT/JP2013/052357
§ 371 (c)(1),
(2) Date: Jul. 29, 2014

(87) PCT Pub. No.: WO2013/115365
PCT Pub. Date: Aug. 8, 2013

(65) Prior Publication Data
US 2015/0015206 A1     Jan. 15, 2015

(30) Foreign Application Priority Data

Feb. 2, 2012    (JP) .................................. 2012-021172

(51) Int. Cl.
*H02J 7/00*         (2006.01)
*B61D 43/00*        (2006.01)
(Continued)

(52) U.S. Cl.
CPC ............. *B60L 11/1838* (2013.01); *B60L 3/04* (2013.01); *B60L 3/12* (2013.01); *B60L 7/14* (2013.01);
(Continued)

(58) Field of Classification Search
CPC . B60M 3/00; B60M 3/02; B60M 3/04; B60M 3/06; B60L 7/10–7/18;
(Continued)

(56) References Cited

U.S. PATENT DOCUMENTS

2003/0197493 A1\* 10/2003 Debard .................... B60L 15/10
323/284
2007/0278059 A1\* 12/2007 Afriat ................. B60L 11/1801
191/29 R
2012/0000739 A1    1/2012 Nogi et al.

FOREIGN PATENT DOCUMENTS

CN          101563253 A        10/2009
JP          2002-369308        12/2002
(Continued)

OTHER PUBLICATIONS

Machine Translation and English Abstract of JP 2002369308 A.\*
(Continued)

*Primary Examiner* — Richard Isla Rodas
*Assistant Examiner* — David V Henze-Gongola
(74) *Attorney, Agent, or Firm* — Wenderoth, Lind & Ponack, L.L.P.

(57) ABSTRACT

A peak cut power calculation unit calculates peak cut power transmittable to an overhead wire as power exhibiting monotonic non-increase with respect to a resistance value of the overhead wire between a vehicle and a substation. In addition, a peak cut unit controls electrical charging/discharging of a rechargeable battery with power of a difference between
(Continued)

load power and transmission peak cut power when the load power is equal to or more than the peak cut power.

10 Claims, 8 Drawing Sheets

(51) Int. Cl.
| | | |
|---|---|---|
| *B61C 3/00* | (2006.01) | |
| *B60L 11/18* | (2006.01) | |
| *B60L 9/18* | (2006.01) | |
| *H02J 1/14* | (2006.01) | |
| *B60L 3/04* | (2006.01) | |
| *B60L 3/12* | (2006.01) | |
| *B60L 7/14* | (2006.01) | |
| *B60M 3/06* | (2006.01) | |
| *H02J 7/02* | (2016.01) | |

(52) U.S. Cl.
CPC ............. *B60L 9/18* (2013.01); *B60L 11/1824* (2013.01); *B60M 3/06* (2013.01); *H02J 1/14* (2013.01); *H02J 7/007* (2013.01); *B60L 2230/30* (2013.01); *B60L 2240/622* (2013.01); *H02J 7/022* (2013.01); *Y02T 10/7005* (2013.01); *Y02T 10/7088* (2013.01); *Y02T 10/7291* (2013.01); *Y02T 10/92* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01)

(58) Field of Classification Search
CPC . B60L 7/22; B60L 5/00–5/42; B60L 2200/26; Y02T 30/12
USPC .......... 320/101, 109; 105/50; 290/3
See application file for complete search history.

(56) References Cited

FOREIGN PATENT DOCUMENTS

| | | | |
|---|---|---|---|
| JP | 2002369308 A | * | 12/2002 |
| JP | 2006-54958 | | 2/2006 |
| JP | 2008-72878 | | 3/2008 |
| JP | 2009-183079 | | 8/2009 |
| JP | 2009-273198 | | 11/2009 |
| JP | 2010-215014 | | 9/2010 |
| JP | 2012-16148 | | 1/2012 |
| JP | 2013-123280 | | 6/2013 |

OTHER PUBLICATIONS

Office Action issued Sep. 6, 2015 in corresponding Chinese Application No. 201380005562.9, with partial English translation.
Notice of Reasons for Rejection issued Jul. 7, 2015 in corresponding Japanese Application No. 2012-021172 (with English translation).
International Search Report issued May 7, 2013 in corresponding International Application No. PCT/JP2013/052357.
Translation of Written Opinion of the International Searching Authority issued May 7, 2013 in corresponding International Application No. PCT/JP2013/052357.

* cited by examiner

ELECTRICAL CHARGING/DISCHARGING CONTROLLER, CHARGING CONTROL METHOD, DISCHARGING CONTROL METHOD, AND PROGRAM

TECHNICAL FIELD

The present invention relates to an electrical charging/discharging controller, a charging control method, a discharging control method and a program for controlling electrical charging/discharging of a rechargeable battery connected to a load that can generate regenerative electric power.

Priority is claimed on Japanese Patent Application No. 2012-021172, filed Feb. 2, 2012, the content of which is incorporated herein by reference.

BACKGROUND ART

Vehicles which run using electric power supplied from an overhead wire are conventionally known. The electric power (required electric power) required for such vehicles to run varies according to the running environment, such as the gradient of a line. Therefore, the capacity or amount of power consumption of a substation which supplies the electric power to the overhead wire is determined based on the amount of voltage change due to the required electric power.

In addition, when regenerative electric power is generated due to braking in such a vehicle, the regenerative electric power is transmitted to the overhead wire in order to prevent regeneration cancellation. The regenerative electric power transmitted to the overhead wire is collected by the substation. Therefore, a distance at which substations are provided is determined based on the amount of voltage change due to the regenerative electric power.

Therefore, suppression of peak power of the required electric power and the regenerative electric power (peak cut) has been studied in order to lower costs of a transportation system by reducing the number of substations. A method of mounting a rechargeable battery on a vehicle and performing absorption of regenerative electric power and assistance of required electric power has been considered as a method for peak cut of the required electric power and the regenerative electric power.

Further, it is necessary to appropriately manage SOC (state of charge) of the rechargeable battery in order to perform the peak cut appropriately.

Therefore, the peak cut using the rechargeable battery is considered when the required electric power or the regenerative electric power is equal to or more than peak cut power.

Further, a method of performing charging in such a manner that an increasing or decreasing SOC is within an appropriate range of SOC in order to suppress deterioration of a rechargeable battery mounted on a vehicle with no overhead wire is described in Patent Literature 1.

In addition, a method of controlling a SOC of a rechargeable battery mounted on a vehicle with no overhead wire is disclosed in Patent Literature 2.

CITATION LIST

Patent Literature

[Patent Literature 1] Japanese Unexamined Patent Application, First Publication No. 2006-054958

[Patent Literature 2] Japanese Unexamined Patent Application, First Publication No. 2009-273198

SUMMARY OF INVENTION

Technical Problem

However, since an overhead wire that mediates power transmission and reception between a vehicle and a substation also has a resistance value, the resistance value increases as the length of the overhead wire between the vehicle and the substation increases. In other words, the power required to undergo the peak cut varies with the positional relationship between the vehicle and the substation. Therefore, there is a problem in that electrical charging/discharging of the rechargeable battery is performed with more power than the required amount when the peak cut is performed based on peak cut power having a constant value, as disclosed in Patent Literature 1 or 2. Accordingly, there is a problem in that the lifespan of the rechargeable battery is shortened and the electrical charging/discharging controller is large.

An object of the present invention is to provide an electrical charging/discharging controller, a charging control method, a discharging control method, and a program for performing peak cut through minimum required electrical charging/discharging.

Solution to Problem

According to a first aspect of the present invention, an electrical charging/discharging controller mounted on a vehicle that runs by performing power transmission and reception to and from substation equipment through an overhead wire to control electrical charging/discharging of a power storage device connected to a load capable of generating regenerative electrical power is characterized by including: a peak cut power calculation unit configured to calculate transmission peak cut power that is power transmittable to the overhead wire, the transmission peak cut power being power exhibiting monotonic non-increase with respect to a resistance value of the overhead wire between the vehicle and the substation equipment; and a peak cut unit configured to charge the power storage device with power of a difference between the regenerative electrical power generated by the load and the transmission peak cut power calculated by the peak cut power calculation unit when the regenerative electrical power is equal to or more than the transmission peak cut power.

The transmission peak cut power may be power obtained by multiplying an electrical current obtained by dividing a difference between a maximum pantograph point voltage at which no regeneration cancellation of the load occurs and a voltage applied to a regenerative resistor of the substation equipment by a resistance value of the overhead wire exhibiting a monotonic decrease with respect to the distance between the vehicle and the substation equipment, by the maximum pantograph point voltage at which no regeneration cancellation of the load occurs.

In the first aspect, the electrical charging/discharging controller may include an overhead wire length calculation unit configured to calculate an overhead wire length between the vehicle and the substation equipment based on a position in which the vehicle is located, and the peak cut power calculation unit may calculate the transmission peak cut power using a monotonically non-increasing function of which the overhead wire length calculated by the overhead wire length calculation unit is an independent variable.

In the first aspect, the electrical charging/discharging controller may include a pantograph point voltage measurement unit configured to measure a pantograph point voltage of the vehicle, and the peak cut power calculation unit may calculate the transmission peak cut power using the monotonically non-increasing function of which the pantograph point voltage measured by the pantograph point voltage measurement unit is an independent variable.

In the first aspect, the electrical charging/discharging controller may include a section acquisition unit configured to acquire a section in which the vehicle is located, and the peak cut power calculation unit may calculate transmission peak cut power corresponding to an overhead wire resistance value of a point farthest from the substation equipment in the section acquired by the section acquisition unit as transmission peak cut power in the section acquired by the section acquisition unit.

In the first aspect, the peak cut power calculation unit may calculate reception peak cut power that is power receivable from the overhead wire, the reception peak cut power being power exhibiting monotonic non-increase with respect to the resistance value of the overhead wire between the vehicle and the substation equipment, and the peak cut unit may discharge power of a difference between required power that is required by the load and the reception peak cut power calculated by the peak cut power calculation unit from the power storage device when the required power is equal to or more than the reception peak cut power.

According to a second aspect of the present invention, an electrical charging/discharging controller mounted on a vehicle that runs by performing power transmission and reception to and from substation equipment through an overhead wire to control electrical charging/discharging of a power storage device connected to a load capable of generating regenerative electrical power is characterized by including: a peak cut power calculation unit configured to calculate reception peak cut power that is power receivable from the overhead wire, the reception peak cut power being power exhibiting monotonic non-increase with respect to the resistance value of the overhead wire between the vehicle and the substation equipment; and a peak cut unit configured to discharge power of a difference between required power that is required by the load and the reception peak cut power calculated by the peak cut power calculation unit from the power storage device when the required power is equal to or more than the reception peak cut power.

According to a third aspect of the present invention, a charging controlling method using an electrical charging/discharging controller mounted on a vehicle that runs by performing power transmission and reception to and from substation equipment through an overhead wire to control electrical charging/discharging of a power storage device connected to a load capable of generating regenerative electrical power is characterized by including: calculating, by a peak cut power calculation unit, transmission peak cut power that is power transmittable to the overhead wire, the transmission peak cut power being power exhibiting monotonic non-increase with respect to a resistance value of the overhead wire between the vehicle and the substation equipment; and charging, by a peak cut unit, the power storage device with power of a difference between the regenerative electrical power generated by the load and the transmission peak cut power calculated by the peak cut power calculation unit when the regenerative electrical power is equal to or more than the transmission peak cut power.

According to a fourth aspect of the present invention, a discharging controlling method using an electrical charging/discharging controller mounted on a vehicle that runs by performing power transmission and reception to and from substation equipment through an overhead wire to control electrical charging/discharging of a power storage device connected to a load capable of generating regenerative electrical power is characterized by including: calculating, by a peak cut power calculation unit, reception peak cut power that is power receivable from the overhead wire, the reception peak cut power being power exhibiting monotonic non-increase with respect to the resistance value of the overhead wire between the vehicle and the substation equipment; and discharging, by a peak cut unit, power of a difference between required power that is required by the load and the reception peak cut power calculated by the peak cut power calculation unit from the power storage device when the required power is equal to or more than the reception peak cut power.

According to a fifth aspect of the present invention, a program causes an electrical charging/discharging controller mounted on a vehicle that runs by performing power transmission and reception to and from substation equipment through an overhead wire to control electrical charging/discharging of a power storage device connected to a load capable of generating regenerative electrical power to function as: a peak cut power calculation unit configured to calculate transmission peak cut power that is power transmittable to the overhead wire, the transmission peak cut power being power exhibiting monotonic non-increase with respect to a resistance value of the overhead wire between the vehicle and the substation equipment; and a peak cut unit configured to charge the power storage device with power of a difference between the regenerative electrical power generated by the load and the transmission peak cut power calculated by the peak cut power calculation unit when the regenerative electrical power is equal to or more than the transmission peak cut power.

According to a sixth aspect of the present invention, a program causes an electrical charging/discharging controller mounted on a vehicle that runs by performing power transmission and reception to and from substation equipment through an overhead wire to control electrical charging/discharging of a power storage device connected to a load capable of generating regenerative electrical power to function as: a peak cut power calculation unit configured to calculate reception peak cut power that is power receivable from the overhead wire, the reception peak cut power being power exhibiting monotonic non-increase with respect to the resistance value of the overhead wire between the vehicle and the substation equipment; and a peak cut unit configured to discharge power of a difference between required power that is required by the load and the reception peak cut power calculated by the peak cut power calculation unit from the power storage device when the required power is equal to or more than the reception peak cut power.

Advantageous Effects of Invention

According to the electrical charging/discharging controller, the charging control method, the discharging control method, and the program described above, when the required electric power or the regenerative electric power is equal to or more than reception peak cut power that is power exhibiting monotonic non-increase with respect to a resistance value of the overhead wire between the vehicle and substation equipment, peak cut is performed using a power storage device. Accordingly, it is possible to perform the peak cut through minimum required electrical charging/discharging.

DESCRIPTION OF EMBODIMENTS

Figure 1:
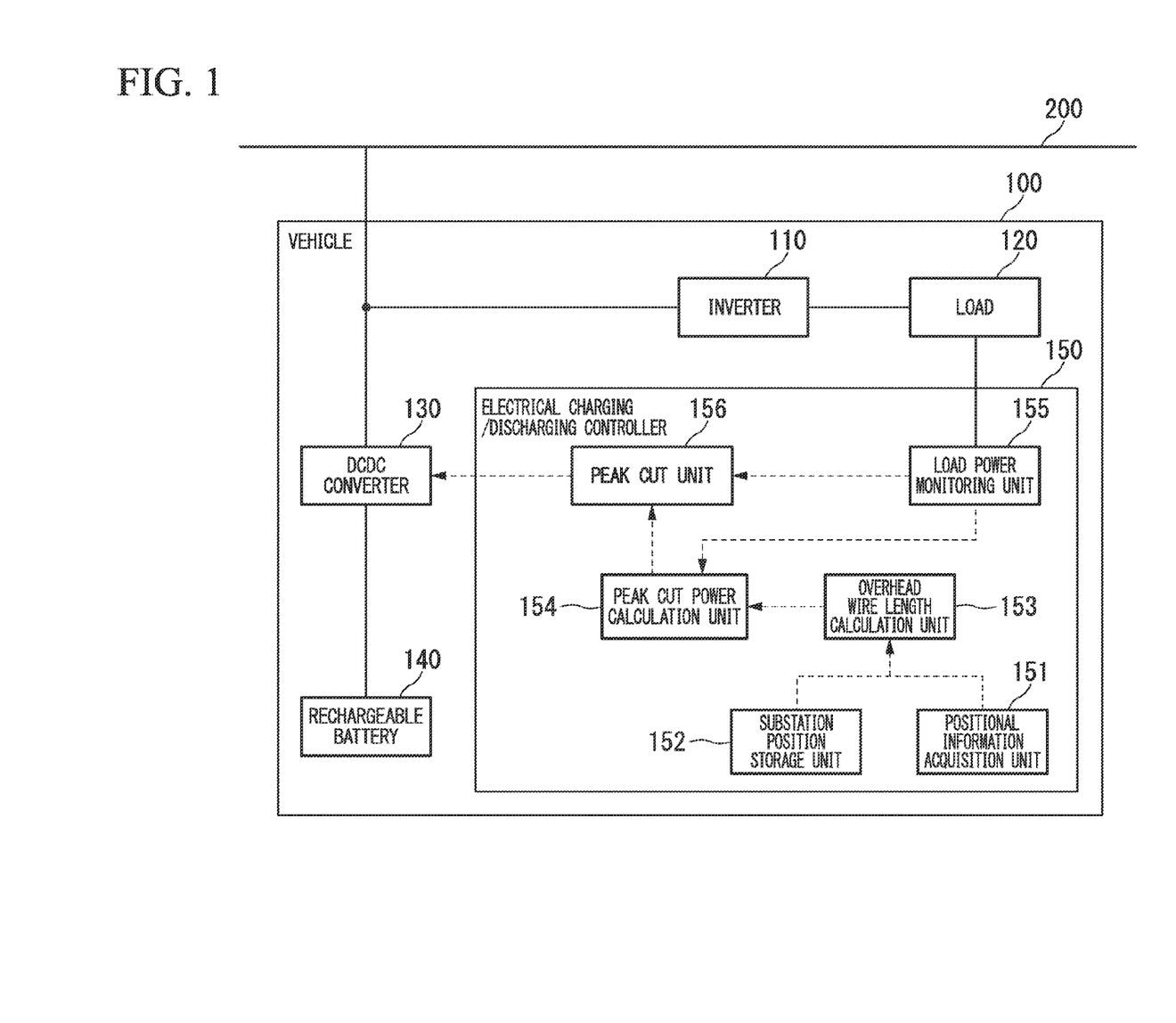
FIG. 1 is a schematic block diagram illustrating a configuration of a vehicle including an electrical charging/discharging controller according to a first embodiment of the present invention.

Hereinafter, embodiments of the present invention will be described in detail with reference to the drawings.
<<First Embodiment>>
FIG. 1 is a schematic block diagram illustrating a configuration of a vehicle 100 including an electrical charging/discharging controller 150 according to a first embodiment of the present invention.

The vehicle 100 according to the present embodiment includes an inverter 110, a load 120, a DCDC converter 130, a rechargeable battery (power storage device) 140, and an electrical charging/discharging controller 150. In addition, the vehicle 100 runs by performing power transmission and reception to and from a substation (substation equipment) through an overhead wire 200.

The inverter 110 converts direct current power supplied from the overhead wire 200 or direct current power supplied from the rechargeable battery 140 through the DCDC converter 130 to alternating current power.

The load 120 causes the vehicle 100 to run with the converted alternating current power from the inverter 110.

Further, the load 120 performs regenerative braking of the vehicle 100 to generate regenerative electric power. The regenerative electric power is supplied to the overhead wire 200 and the rechargeable battery 140 through the inverter 110.

The DCDC converter 130 controls an amount of charging power supplied from the overhead wire 200 and the load 120 to the rechargeable battery 140 and an amount of discharging power supplied from the rechargeable battery 140 to the overhead wire 200 and the load 120 based on an instruction from the electrical charging/discharging controller 150.

The rechargeable battery 140 is connected to the overhead wire 200 and the load 120 through the DCDC converter 130, and charged with the electric power supplied from the overhead wire 200 and the load 120. In addition, the rechargeable battery 140 supplies the electrical power to the load 120 through the DCDC converter 130.

The electrical charging/discharging controller 150 is a device that controls charging/discharging of the rechargeable battery 140, and includes a positional information acquisition unit 151, a substation position storage unit 152, an overhead wire length calculation unit 153, a peak cut power calculation unit 154, a load power monitoring unit 155, and a peak cut unit 156.

The positional information acquisition unit 151 acquires a current position of the vehicle 100 based on, for example, the GPS (Global Positioning System), the number of revolutions of a motor, and information received from a ground element.

The substation position storage unit 152 stores a position of the overhead wire 200 and a position of the substation connected to the overhead wire 200.

The overhead wire length calculation unit 153 calculates a length of the overhead wire between the vehicle 100 and the substation based on positional information acquired by the positional information acquisition unit 151 and information stored in the substation position storage unit 152.

The peak cut power calculation unit 154 calculates peak cut power based on the overhead wire length calculated by the overhead wire length calculation unit 153. Specifically, the peak cut power calculation unit 154 calculates reception peak cut power that is a maximum of power receivable from the overhead wire 200 and transmission peak cut power that is a maximum of power transmittable to the overhead wire 200.

The load power monitoring unit 155 monitors a power value of the required electric power that is required for power running by the load 120 and a power value of the regenerative electric power generated from the load 120. Hereinafter, the required electric power and the regenerative electric power are collectively referred to as load power.

The peak cut unit 156 outputs a control instruction for power that is charged/discharged in the rechargeable battery 140 to the DCDC converter 130 so that the power to be received from the overhead wire 200 or the power to be transmitted to the overhead wire 200 does not exceed predetermined peak cut power. Specifically, the peak cut unit 156 outputs a discharging instruction to discharge power having a power value of a difference between the required electric power and the reception peak cut power from the rechargeable battery 140 at the time of power-running of the vehicle 100. On the other hand, the peak cut unit 156 outputs a charging instruction to charge the rechargeable battery 140 with power having a power value of a difference between the regenerative electric power and the transmission peak cut power at the time of braking of the vehicle 100.

Next, an operation of the electrical charging/discharging controller 150 according to the present embodiment will be described.

Figure 2:
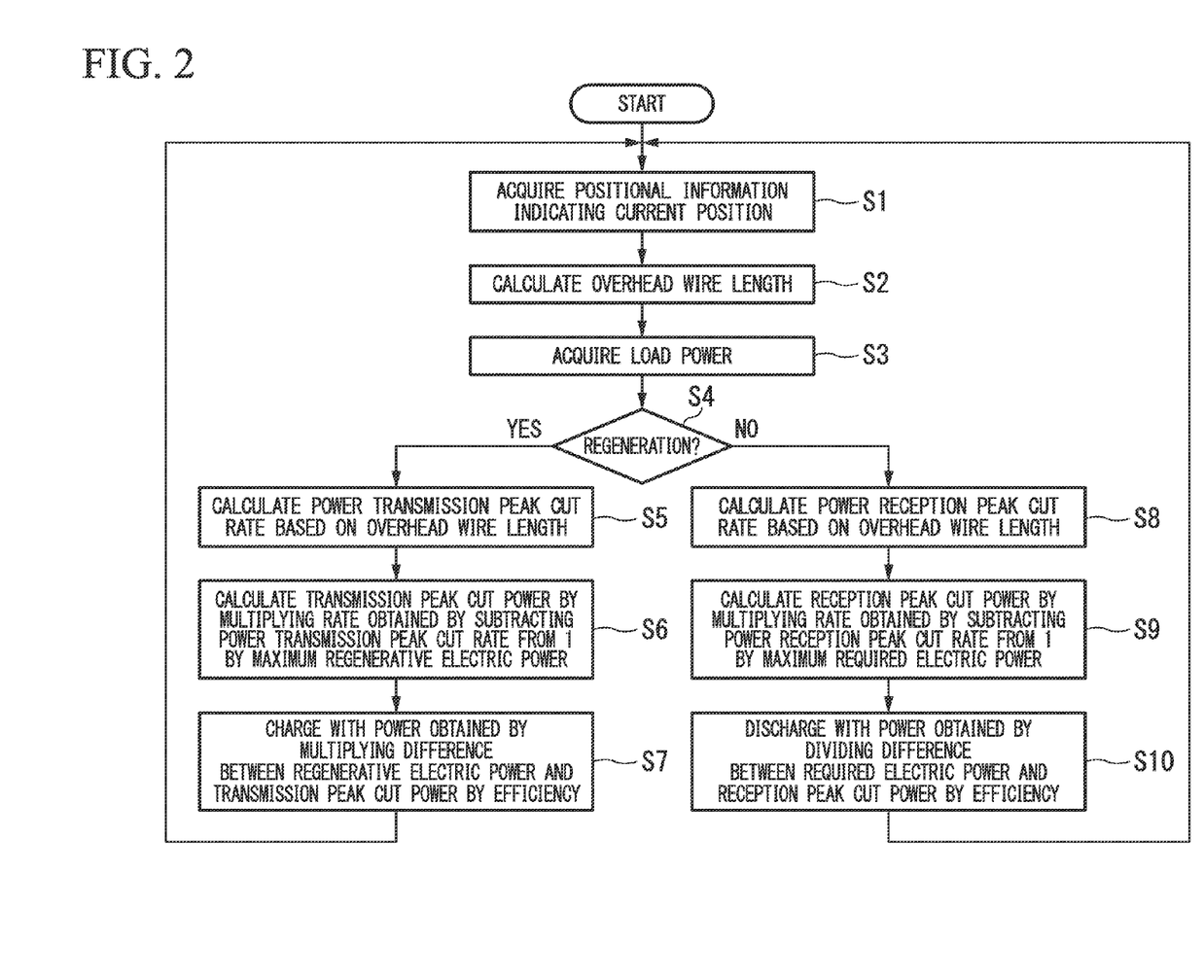
FIG. 2 is a flowchart illustrating an operation of the electrical charging/discharging controller according to the first embodiment of the present invention.

FIG. 2 is a flowchart illustrating an operation of the electrical charging/discharging controller 150 according to the first embodiment of the present invention.

When running of the vehicle 100 starts, the positional information acquisition unit 151 acquires the positional information indicating the current position based on the GPS, the number of revolutions of a motor, and information received from a ground element (step S1). The overhead wire length calculation unit 153 then calculates a length of the overhead wire 200 up to the substation to and from which the vehicle 100 performs power transmission and reception, based on the information indicating the current position acquired by the positional information acquisition unit 151, and the position of the overhead wire 200 and the position of the substation stored in the substation position storage unit 152 (step S2). Specifically, the overhead wire length calculation unit 153 identifies the substation connected to the overhead wire 200 present in the current position as a substation to and from which the vehicle 100 performs power transmission and reception, and calculates a length of the overhead wire 200 up to the substation.

The load power monitoring unit 155 then acquires the load power (step S3). The load power monitoring unit 155 then determines whether an operation of the load 120 is power-running or regeneration (step S4).

When the load power monitoring unit 155 determines that the load 120 is performing the regeneration (step S4: YES), the peak cut power calculation unit 154 calculates a power transmission peak cut rate indicating a rate at which the peak cut is performed on a peak value of the regenerative electric power generated from the load 120, based on the overhead wire length calculated by the overhead wire length calculation unit 153 (step S5).

Here, a specific method of calculating the peak cut rate will be described.

Figure 3A:
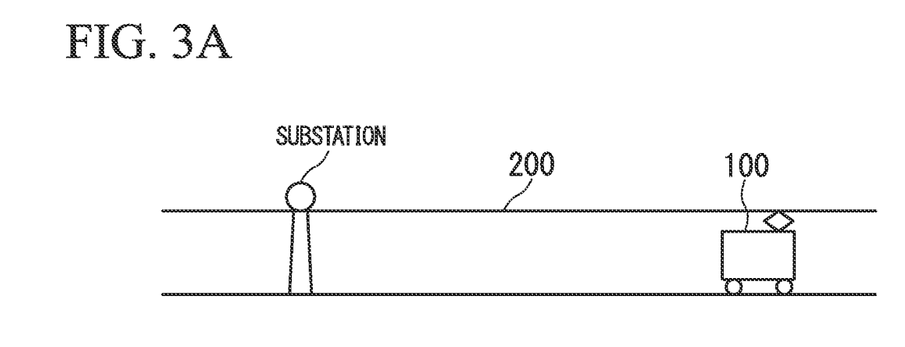
FIG. 3A is a diagram illustrating a model of a relationship between a vehicle and a substation.
Figure 3B:
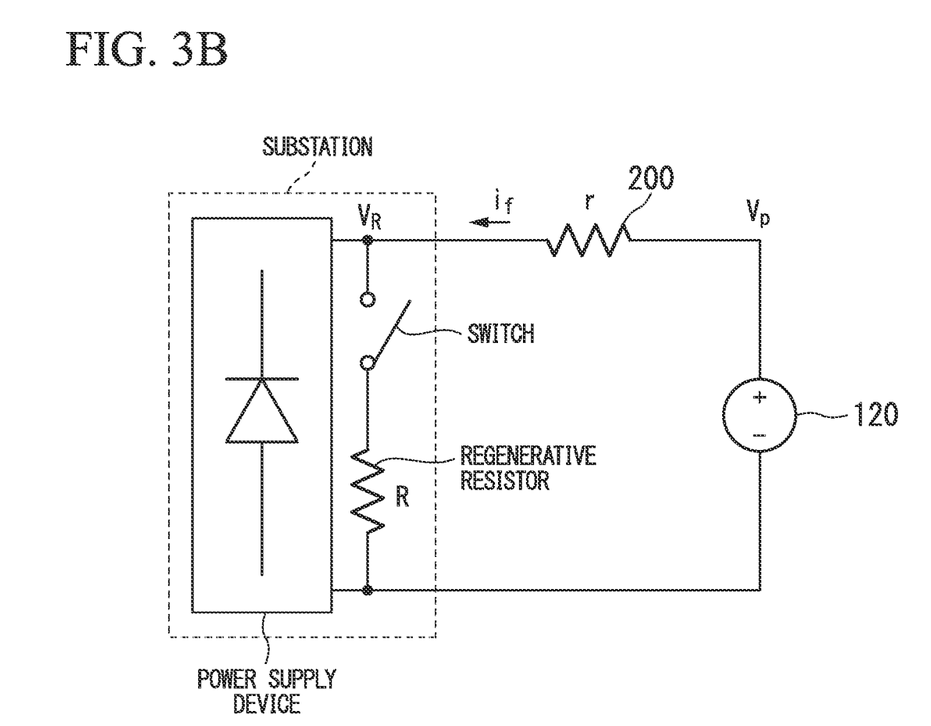
FIG. 3B is a circuit diagram illustrating a model of a relationship between a vehicle and a substation.

FIG. 3A is a diagram illustrating a model of a relationship between the vehicle 100 and the substation. FIG. 3B is a circuit diagram illustrating a model of a relationship between the vehicle 100 and the substation.

The vehicle 100 and the substation are connected by the overhead wire 200 as illustrated in FIG. 3A and a closed circuit as illustrated in FIG. 3B is formed. In the substation, a regenerative resistor R is provided via a switch in parallel to a power supply device, as illustrated in FIG. 3B. The switch is turned ON when a voltage equal to or more than a predetermined threshold voltage $v_R$ is applied to one terminal of the switch, and OFF when the voltage applied to the one terminal of the switch is less than the threshold voltage $v_R$. In other words, when the voltage applied to the one terminal of the switch of the substation is equal to or more than the threshold voltage $v_R$, the regenerative electric power generated from the load 120 of the vehicle 100 is collected in the substation.

In addition, the overhead wire 200 between the vehicle 100 and the substation also has a resistance value (hereinafter referred to as an overhead wire resistance r), and the overhead wire resistance r has a value that monotonically increases with respect to the overhead wire length between the vehicle 100 and the substation.

In this case, two expressions below are satisfied in the model illustrated in FIG. 3B.

[Expression 1]

$$v_P i_f = P(1-x) \quad (1)$$

[Expression 2]

$$v_P = v_R + r i_f \quad (2)$$

Here, P indicates maximum regenerative electric power that may be generated from the load 120, and x indicates the power transmission peak cut rate.

Here, when a maximum pantograph point voltage at which no regeneration cancellation occurs is $v_{Pmax}$, the power transmission peak cut rate x necessary to prevent occurrence of the regeneration cancellation is as shown in Expression 3.

[Expression 3]

$$x \geq 1 - \frac{v_{Pmax} - v_R}{rP} v_{Pmax} \quad (3)$$

Generally, the maximum pantograph point voltage $v_{Pmax}$ at which no regeneration cancellation occurs, the threshold voltage $v_R$ of the switch, and the maximum regenerative electric power P that can be generated from the load 120 are values specific to the substation or the vehicle 100. Therefore, it can be seen from Expression 3 that the required power transmission peak cut rate x changes according to a size of the overhead wire resistance r. It is also seen that, since the size of the overhead wire resistance r is determined based on the overhead wire length between the vehicle 100 and the substation, the power transmission peak cut rate x is determined based on the overhead wire length between the vehicle 100 and the substation. In other words, the peak cut power calculation unit 154 may calculate the overhead wire resistance r from the overhead wire length between the vehicle 100 and the substation and calculate the power transmission peak cut rate x by applying the overhead wire resistance r to Expression 3 above. In addition, the power transmission peak cut rate x exhibits monotonic non-decrease with respect to the overhead wire resistance r, as shown in Expression 3. In addition, the method described using FIGS. 3A and 3B is a method of calculating the power transmission peak cut rate x when there is one substation that performs power transmission and reception to and from the vehicle 100. In fact, the vehicle 100 performs weighting based on an overhead wire length up to each of a plurality of substations to perform power transmission and reception to and from the plurality of substations, and calculates the power transmission peak cut rate x using the same method.

When the peak cut power calculation unit 154 calculates the power transmission peak cut rate x in step S5, the peak cut power calculation unit 154 calculates transmission peak cut power by multiplying the maximum regenerative electric power P that can be generated from the load 120 by a rate obtained by subtracting the power transmission peak cut rate x from 1 (step S6). In other words, the peak cut power calculation unit 154 calculates P (1−x) as the transmission peak cut power. In addition, it can be seen that the transmission peak cut power exhibits monotonic non-increase with respect to the overhead wire length since the power transmission peak cut rate exhibits the monotonic non-decrease with respect to the overhead wire length.

Further, in this embodiment, the overhead wire resistance r is calculated from the overhead wire length and then the power transmission peak cut rate x is calculated from the overhead wire resistance r in step S5, and the transmission peak cut power is calculated from the power transmission peak cut rate x in step S6. This is equivalent to calculation of the transmission peak cut power using a monotonic non-increasing function of which the overhead wire length calculated by the overhead wire length calculation unit 153 is an independent variable.

Figure 4:
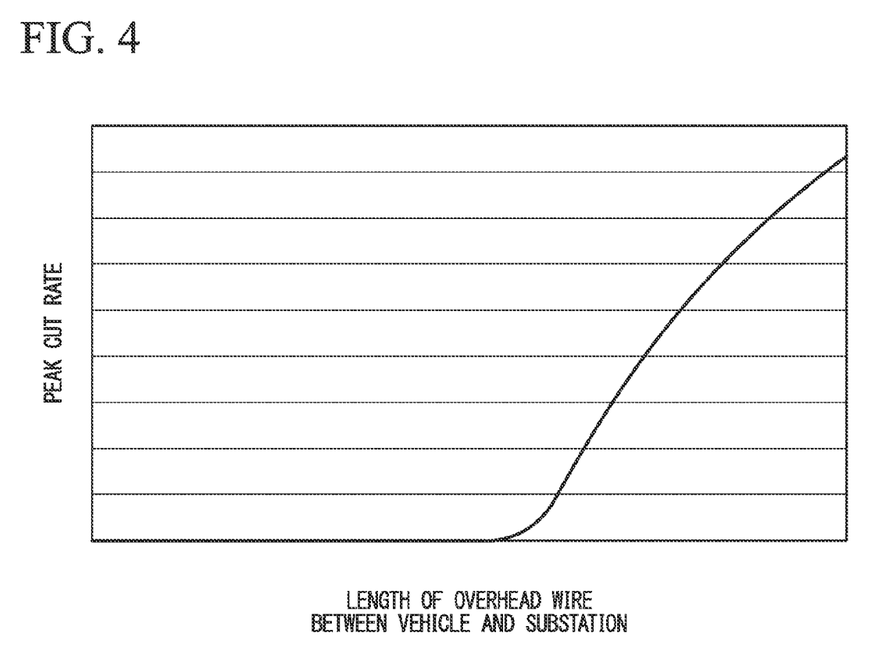
FIG. 4 is a graph showing an example of a relationship between an overhead wire length between the vehicle and the substation, and a peak cut rate in the first embodiment.

FIG. 4 is a graph showing an example of a relationship between the overhead wire length between the vehicle 100 and the substation, and the peak cut rate in the first embodiment.

As illustrated in FIG. 4, no regeneration cancellation occurs even when peak cut is not performed before the overhead wire length reaches a predetermined length. After the overhead wire length exceeds the predetermined length, the peak cut is performed at the peak cut rate illustrated in FIG. 4, so that the maximum power at which no regeneration cancellation occurs can be transmitted to the overhead wire 200. Accordingly, it is possible to perform the peak cut while minimizing power with which the rechargeable battery 140 is charged. In addition, it can be seen that the transmission peak cut power exhibits monotonic non-increase with respect to the overhead wire length calculated by the overhead wire length calculation unit 153, as illustrated in FIG. 4.

The peak cut unit 156 then outputs, to the DCDC converter 130, a charging instruction to charge the rechargeable battery 140 with a power value obtained by multiplying the power of the difference between the regenerative electric power and the transmission peak cut power by efficiency of the DCDC converter 130 (step S7). Also, the process proceeds to step S1, in which the electrical charging/discharging controller 150 performs electrical charging/discharging control at the next time.

On the other hand, when the load power monitoring unit 155 determines that the load 120 runs in step S4 (step S4: NO), the peak cut power calculation unit 154 calculates a power reception peak cut rate indicating a rate at which peak cut is performed on the peak value of the required electric power required by the load 120 based on the overhead wire length calculated by the overhead wire length calculation unit 153 (step S8). In addition, the power reception peak cut rate is calculated using the same method as the method of step S5 described above, and the calculated power reception peak cut rate exhibits monotonic non-decrease with respect to the overhead wire resistance.

If the peak cut power calculation unit 154 calculates the power reception peak cut rate, the peak cut power calculation unit 154 calculates the reception peak cut power by multiplying maximum required electric power that may be required by the load 120 by a rate obtained by subtracting the power reception peak cut rate from 1 (step S9). In other words, it can be seen that the reception peak cut power exhibits monotonic non-increase with respect to the overhead wire length. In other words, the process of the peak cut power calculation unit 154 in steps S8 and S9 is equivalent to calculation of the reception peak cut power using a monotonically non-increasing function of which the overhead wire length calculated by the overhead wire length calculation unit 153 is an independent variable.

The peak cut unit 156 then outputs, to the DCDC converter 130, a discharging instruction to discharge the rechargeable battery 140 with a power value obtained by dividing the power of the difference between the required electric power and the reception peak cut power by efficiency of the DCDC converter 130 (step S10). Also, the process proceeds to step S1, in which the electrical charging/discharging controller 150 performs electrical charging/discharging control at the next time.

Thus, according to this embodiment, the peak cut power calculation unit 154 calculates the peak cut power transmittable to the overhead wire 200 as power exhibiting monotonic non-increase with respect to the resistance value of the overhead wire 200 between the vehicle 100 and the substation. In addition, when the load power is equal to or more than the peak cut power, the peak cut unit 156 controls electrical charging/discharging of the rechargeable battery 140 with the power of the difference between the load power and the transmission peak cut power. Accordingly, it is possible to perform the peak cut while suppressing power for charging the rechargeable battery 140 to be minimum required power.

Further, according to this embodiment, the peak cut power is obtained by multiplying the maximum regenerative electric power P that can be generated from the load 120 by the rate obtained by subtracting the peak cut power calculated by Expression 3 from 1. In other words, the transmission peak cut power is power obtained by multiplying an electrical current obtained by dividing a difference between the maximum pantograph point voltage at which no regeneration cancellation occurs and the voltage applied to the regenerative resistor of the substation by the resistance value of the overhead wire 200 exhibiting monotonic decrease with respect to the distance between the vehicle 100 and the substation, by the maximum pantograph point voltage at which no regeneration cancellation occurs. Therefore, the electrical charging/discharging controller 150 can perform power transmission and reception to and from the overhead wire 200 with the maximum power at which no regeneration cancellation occurs.

<<Second Embodiment>>

Next, a second embodiment of the present invention will be described.

Figure 5:
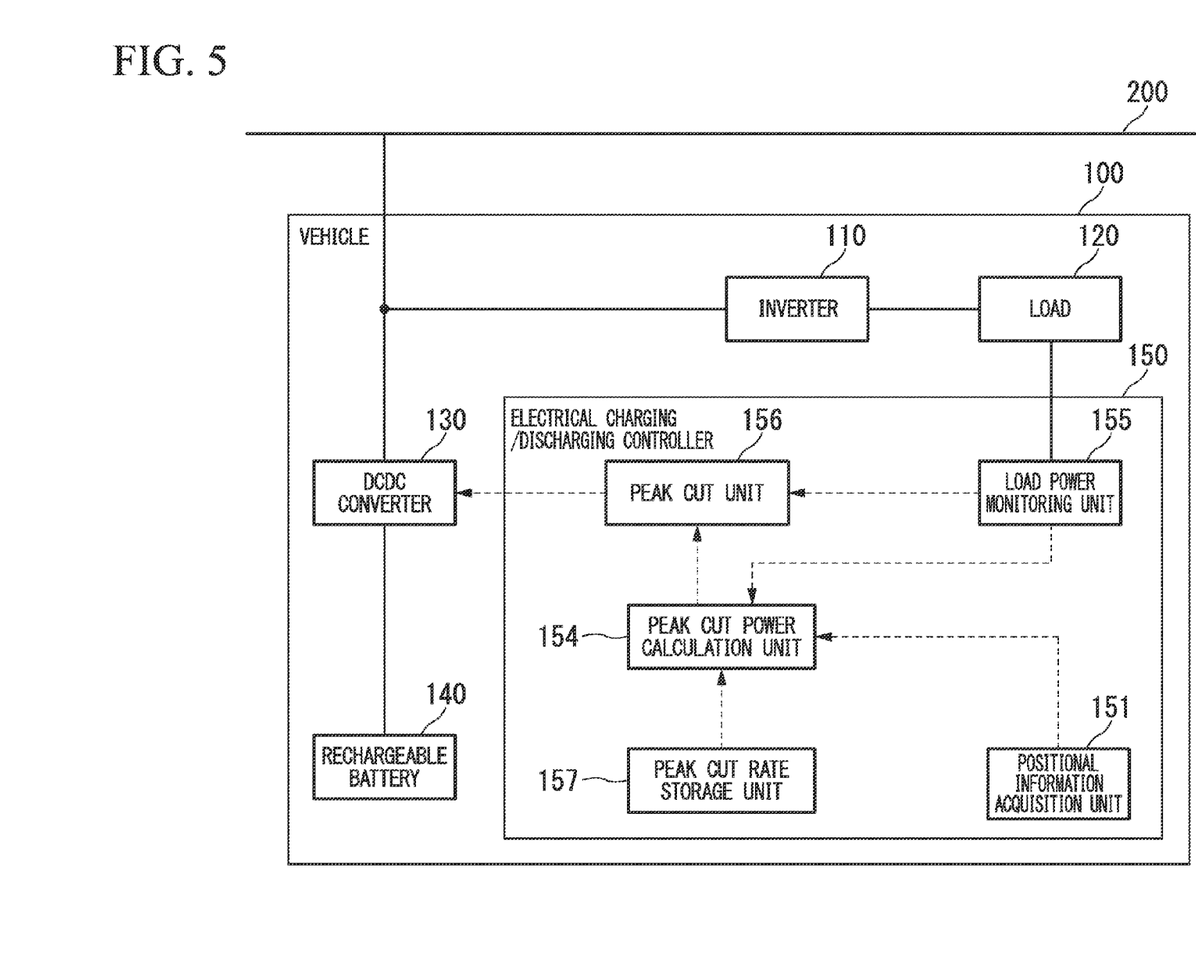
FIG. 5 is a schematic block diagram illustrating a configuration of a vehicle including an electrical charging/discharging controller according to a second embodiment of the present invention.

FIG. 5 is a schematic block diagram illustrating a configuration of a vehicle 100 including an electrical charging/discharging controller 150 according to a second embodiment of the present invention.

The electrical charging/discharging controller 150 according to the second embodiment includes a peak cut rate storage unit 157 that stores peak cut rates used in predetermined sections (e.g., sections between stations) for the respective predetermined sections, instead of including the overhead wire length calculation unit 153 and the substation position storage unit 152 in the configuration of the electrical charging/discharging controller 150 according to the first embodiment.

In addition, the peak cut rate stored in the peak cut rate storage unit 157 is a peak cut rate calculated for each section by the method shown in the first embodiment using an overhead wire resistance value of a point farthest from the substation in the section.

In addition, processes of a positional information acquisition unit 151 and a peak cut power calculation unit 154 in the electrical charging/discharging controller 150 according to the second embodiment is different from that in the first embodiment.

The positional information acquisition unit 151 (a section acquisition unit) acquires positional information indicating a section in which the vehicle 100 is located from a ground element.

The peak cut power calculation unit 154 reads a peak cut rate associated with the positional information acquired by the positional information acquisition unit 151 from the peak cut rate storage unit 157, and calculates the peak cut power based on the peak cut rate.

Figure 6:
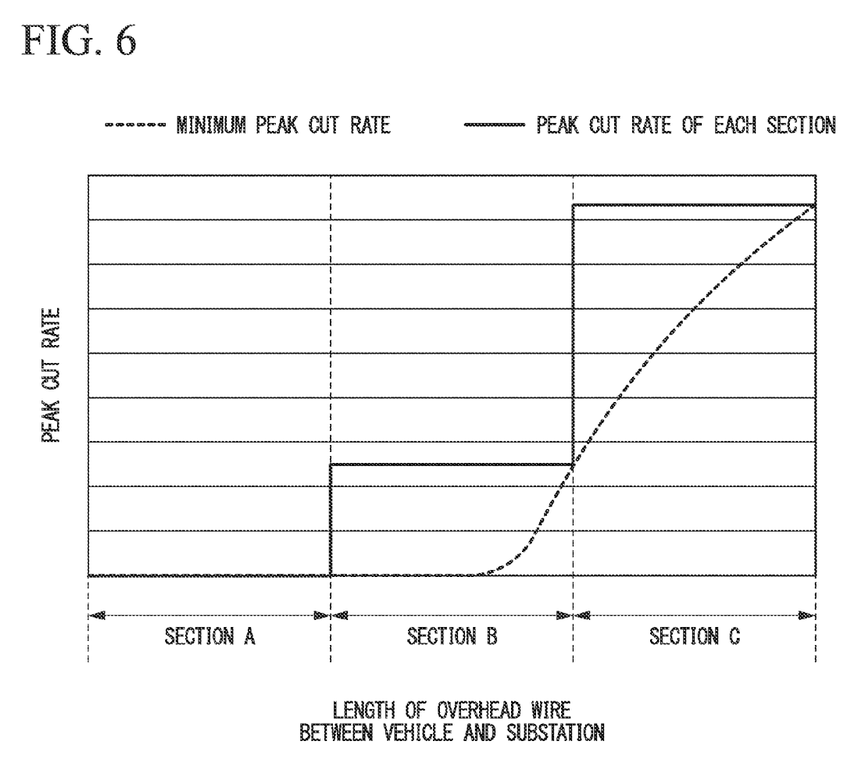
FIG. 6 is a graph showing an example of a relationship between an overhead wire length between the vehicle and a substation, and a peak cut rate in the second embodiment.

FIG. 6 is a graph showing an example of a relationship between the overhead wire length between the vehicle 100 and the substation and the peak cut rate in the second embodiment.

The peak cut rate in each section is equal to or more than the peak cut rate calculated in the first embodiment, as illustrated in FIG. 6. In other words, the peak cut rate in each section is a minimum peak cut rate so that no regeneration cancellation necessarily occurs when power transmission and reception to and from the overhead wire 200 are performed. Accordingly, according to this embodiment, although the efficiency is degraded, the peak cut can be performed with a simpler configuration in comparison with the first embodiment.

<<Third Embodiment>>

Next, a third embodiment of the present invention will be described.

Figure 7:
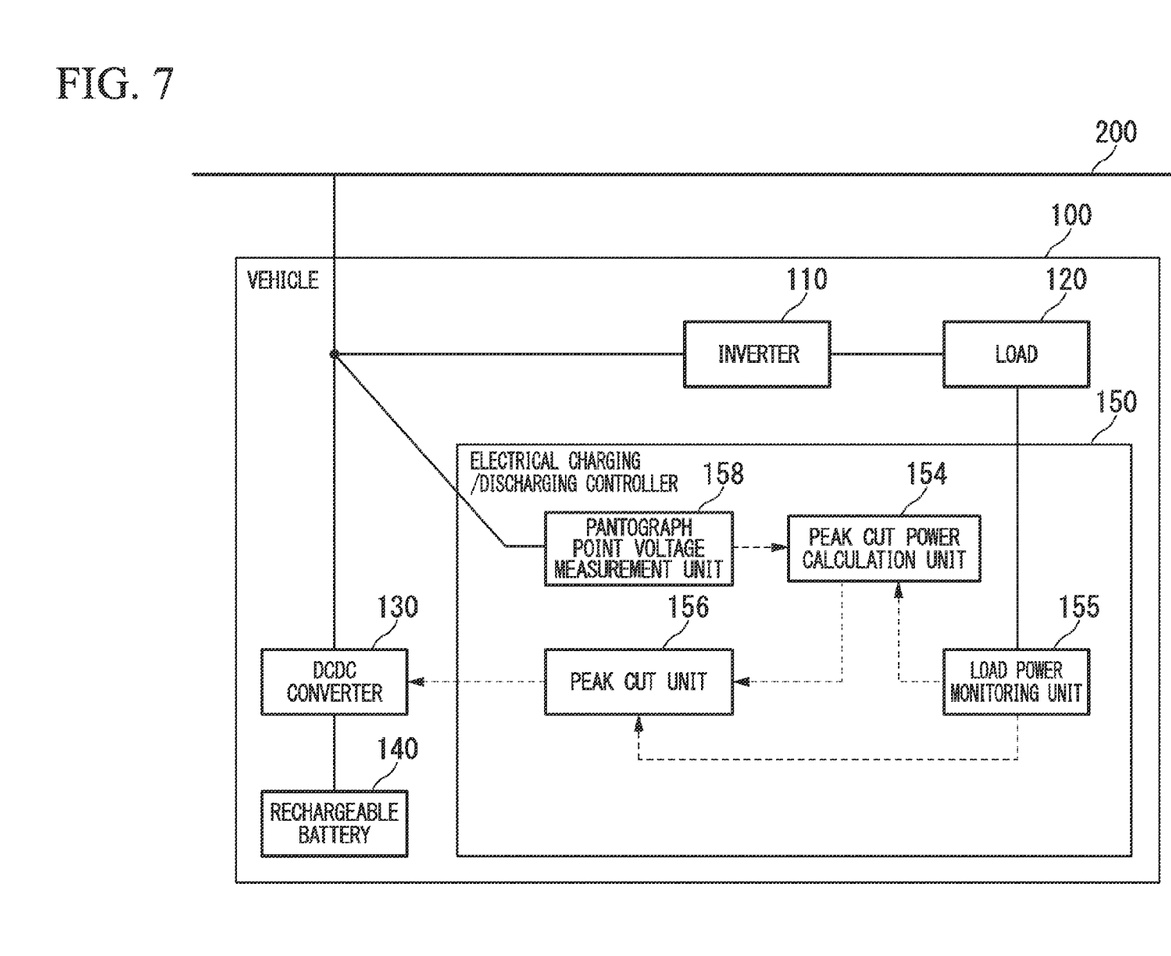
FIG. 7 is a schematic block diagram illustrating a configuration of a vehicle including an electrical charging/discharging controller according to a third embodiment of the present invention.

FIG. 7 is a schematic block diagram illustrating a configuration of a vehicle 100 including an electrical charging/discharging controller 150 according to the third embodiment of the present invention.

The electrical charging/discharging controller 150 according to the third embodiment includes a pantograph point voltage measurement unit 158 instead of including the positional information acquisition unit 151, the substation position storage unit 152 and the overhead wire length calculation unit 153 in the configuration of the electrical charging/discharging controller 150 according to the first embodiment. In addition, the electrical charging/discharging controller 150 according to the third embodiment is different from that of the first embodiment in a process of a peak cut power calculation unit 154.

The pantograph point voltage measurement unit 158 includes, for example, a voltage sensor, and measures a pantograph point voltage of the vehicle 100.

The peak cut power calculation unit 154 calculates peak cut power based on the pantograph point voltage acquired by the pantograph point voltage measurement unit 158.

Figure 8:
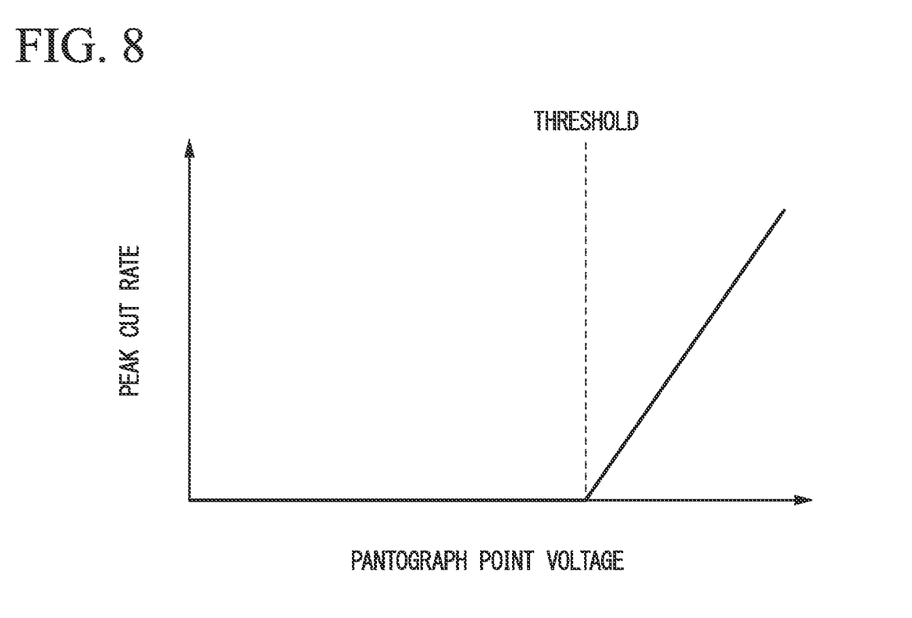
FIG. 8 is a graph showing an example of a relationship between a pantograph point voltage and a peak cut rate in the third embodiment.

FIG. 8 is a graph showing an example of a relationship of the pantograph point voltage and the peak cut rate in the third embodiment.

The peak cut power calculation unit 154 causes the peak cut rate to be zero when the pantograph point voltage is equal to or less than a predetermined threshold (a threshold equal to or less than a regeneration cancellation voltage), as illustrated in FIG. 8. On the other hand, the peak cut power calculation unit 154 calculates the peak cut rate that is proportional to a voltage of a difference between the pantograph point voltage and the threshold when the pantograph point voltage exceeds the predetermined threshold. Also, the peak cut power calculation unit 154 calculates peak cut power based on the peak cut rate. In other words, the peak cut power calculation unit 154 calculates transmission peak cut power using a monotonically non-increasing function of which the pantograph point voltage measured by the pantograph point voltage measurement unit 158 is an independent variable.

According to Ohm's law, the pantograph point voltage increases monotonically with respect to the overhead wire resistance. Also, the peak cut power exhibits monotonic non-increase with respect to overhead wire resistance, as illustrated in the first embodiment. From this, it can be seen that the same effects as those of the first embodiment can be obtained even when the peak cut power is calculated based on the pantograph point voltage.

While some embodiments of the present invention have been described in detail with reference to the drawings, a concrete configuration is not limited to the configuration described above and various design changes, for example, may be made without departing from the gist of the present invention.

For example, while the case in which the rechargeable battery 140 is used as the power storage device has been described in each embodiment described above, the present invention is not limited thereto and, for example, another power storage device such as a capacitor may be used.

Further, while the case in which the peak cut power calculation unit 154 first calculates the peak cut rate and then calculates the peak cut power based on the peak cut rate has been described in each embodiment described above, the present invention is not limited thereto and the peak cut power calculation unit 154 may directly calculate the peak cut power without calculating the peak cut rate.

Further, while the case in which the load power monitoring unit 155 is connected to the load 120 and directly monitors the load power has been described in each embodiment described above, the present invention is not limited thereto. For example, the load power monitoring unit 155 may calculate power of the input side of the inverter 110 based on monitored load power in consideration of efficiency of the inverter 110 and use the power as load power, thus improving precision. Further, the load power monitoring unit 155 may directly monitor power of the input side of the inverter 110 without the load 120, thus improving the precision.

Further, while the case in which the electrical charging/discharging controller 150 and the DCDC converter 130 are provided as individual devices in each embodiment has been described above, the present invention is not limited thereto and the electrical charging/discharging controller 150 may be mounted as an internal function of the DCDC converter 130.

The above-described electrical charging/discharging controller 150 has a computing system provided therein. Also, the above process is performed by storing the operation of each processing unit described above in the form of a program in a computer-readable recording medium and by a computer reading and executing the program. Here, the computer-readable recording medium refers to, for example, a magnetic disk, a magnetic optical disc, a CD-ROM, a DVD-ROM, or a semiconductor memory. In addition, this computer program may be distributed to a computer by a communication line, and the computer receiving this distribution may execute the program.

In addition, the above program may be intended to realize some of the functions described above.

Further, the program may be a program capable of realizing the above-described functions through a combination with a program previously stored in a computer system, i.e., a differential file (a differential program).

INDUSTRIAL APPLICABILITY

According to the electrical charging/discharging controller, the charging control method, the discharging control method, and the program described above, when the required electric power or the regenerative electric power is equal to or more than reception peak cut power that is power exhibiting monotonic non-increase with respect to the resistance value of the overhead wire between the vehicle and substation equipment, peak cut is performed using a power storage device. Accordingly, it is possible to perform the peak cut through minimum required electrical charging/discharging.

REFERENCE SIGNS LIST 100 vehicle
110 inverter
120 load
130 DCDC converter
140 rechargeable battery
150 electrical charging/discharging controller 151 positional information acquisition unit
152 substation position storage unit
153 overhead wire length calculation unit
154 peak cut power calculation unit
155 load power monitoring unit
156 peak cut unit
157 peak cut rate storage unit
158 pantograph point voltage measurement unit
200 overhead wire

The invention claimed is:

1. An electrical charging/discharging controller mounted on a vehicle that runs by performing power transmission and reception to and from substation equipment through an overhead wire to control electrical charging/discharging of a power storage device connected to a load capable of generating regenerative electrical power, the electrical charging/discharging controller comprising:
a peak cut power calculation unit configured to calculate transmission peak cut power that is power transmittable to the overhead wire, the transmission peak cut power being power exhibiting monotonic non-increase with respect to a resistance value of the overhead wire between the vehicle and the substation equipment; and
a peak cut unit configured to charge the power storage device with power of a difference between the regenerative electrical power generated by the load and the transmission peak cut power calculated by the peak cut power calculation unit when the regenerative electrical power is equal to or more than the transmission peak cut power, wherein
the peak cut power calculation unit is configured to calculate an electrical current by dividing a voltage difference by a resistance value of the overhead wire, the voltage difference being a difference between a maximum pantograph point voltage at which no regeneration cancelation of the load occurs and a voltage applied to a regenerative resistor of the substation equipment, the resistance value of the overhead wire exhibiting monotonic increase with respect to the distance between the vehicle and the substation equipment, and
the peak cut power calculation unit is configured to calculate the transmission peak cut power by multiplying the electrical current by the maximum pantograph point voltage at which no regeneration cancelation of the load occurs.

2. The electrical charging/discharging controller according to claim 1, comprising an overhead wire length calculation unit configured to calculate an overhead wire length between the vehicle and the substation equipment based on a position in which the vehicle is located,
wherein the peak cut power calculation unit calculates the transmission peak cut power using a monotonically non-increasing function of which the overhead wire length calculated by the overhead wire length calculation unit is an independent variable.

3. The electrical charging/discharging controller according to claim 1, further comprising a pantograph point voltage measurement unit configured to measure a pantograph point voltage of the vehicle,
wherein the peak cut power calculation unit calculates the transmission peak cut power using a monotonically non-increasing function of which the pantograph point voltage measured by the pantograph point voltage measurement unit is an independent variable.

4. The electrical charging/discharging controller according to claim 1, further comprising a section acquisition unit configured to acquire a section in which the vehicle is located,
wherein the peak cut power calculation unit calculates transmission peak cut power corresponding to an overhead wire resistance value of a point farthest from the substation equipment in the section acquired by the section acquisition unit as transmission peak cut power in the section acquired by the section acquisition unit.

5. The electrical charging/discharging controller according to claim 1,
wherein the peak cut power calculation unit calculates reception peak cut power that is power receivable from the overhead wire, the reception peak cut power being power exhibiting monotonic non-increase with respect to the resistance value of the overhead wire between the vehicle and the substation equipment, and
the peak cut unit discharges power of a difference between required power that is required by the load and the reception peak cut power calculated by the peak cut power calculation unit from the power storage device when the required power is equal to or more than the reception peak cut power.

6. An electrical charging/discharging controller mounted on a vehicle that runs by performing power transmission and reception to and from substation equipment through an overhead wire to control electrical charging/discharging of a power storage device connected to a load capable of generating regenerative electrical power, the electrical charging/discharging controller comprising:
a peak cut power calculation unit configured to calculate reception peak cut power that is power receivable from the overhead wire, the reception peak cut power being power exhibiting monotonic non-increase with respect to the resistance value of the overhead wire between the vehicle and the substation equipment; and
a peak cut unit configured to discharge power of a difference between required power that is required by the load and the reception peak cut power calculated by the peak cut power calculation unit from the power storage device when the required power is equal to or more than the reception peak cut power, wherein
the peak cut power calculation unit is configured to calculate an electrical current by dividing a voltage difference by a resistance value of the overhead wire, the voltage difference being a difference between a maximum pantograph point voltage at which no regeneration cancelation of the load occurs and a voltage applied to a regenerative resistor of the substation equipment, the resistance value of the overhead wire exhibiting monotonic increase with respect to the distance between the vehicle and the substation equipment, and
the peak cut power calculation unit is configured to calculate the reception peak cut power by multiplying the electrical current by the maximum pantograph point voltage at which no regeneration cancelation of the load occurs.

7. A charging controlling method using an electrical charging/discharging controller mounted on a vehicle that runs by performing power transmission and reception to and from substation equipment through an overhead wire to control electrical charging/discharging of a power storage device connected to a load capable of generating regenerative electrical power, the charging controlling method comprising:

calculating, by a peak cut power calculation unit, an electrical current by dividing a voltage difference by a resistance value of the overhead wire, the voltage difference being a difference between a maximum pantograph point voltage at which no regeneration cancelation of the load occurs and a voltage applied to a regenerative resistor of the substation equipment, the resistance value of the overhead wire exhibiting monotonic increase with respect to the distance between the vehicle and the substation equipment calculating, by the peak cut power calculation unit, transmission peak cut power that is power transmittable to the overhead wire, by multiplying the electrical current by the maximum pantograph point voltage at which no regeneration cancelation of the load occurs, the transmission peak cut power being power exhibiting monotonic non-increase with respect to a resistance value of the overhead wire between the vehicle and the substation equipment; and charging, by a peak cut unit, the power storage device with power of a difference between the regenerative electrical power generated by the load and the transmission peak cut power calculated by the peak cut power calculation unit when the regenerative electrical power is equal to or more than the transmission peak cut power.

8. A discharging controlling method using an electrical charging/discharging controller mounted on a vehicle that runs by performing power transmission and reception to and from substation equipment through an overhead wire to control electrical charging/discharging of a power storage device connected to a load capable of generating regenerative electrical power, the discharging controlling method comprising:

calculating, by a peak cut power calculation unit, an electrical current by dividing a voltage difference by a resistance value of the overhead wire, the voltage difference being a difference between a maximum pantograph point voltage at which no regeneration cancelation of the load occurs and a voltage applied to a regenerative resistor of the substation equipment, the resistance value of the overhead wire exhibiting monotonic increase with respect to the distance between the vehicle and the substation equipment;

calculating, by the peak cut power calculation unit, reception peak cut power that is power receivable from the overhead wire, by multiplying the electrical current by the maximum pantograph point voltage at which no regeneration cancelation of the load occurs, the reception peak cut power being power exhibiting monotonic non-increase with respect to the resistance value of the overhead wire between the vehicle and the substation equipment; and discharging, by a peak cut unit, power of a difference between required power that is required by the load and the reception peak cut power calculated by the peak cut power calculation unit from the power storage device when the required power is equal to or more than the reception peak cut power.

9. A program for causing an electrical charging/discharging controller mounted on a vehicle that runs by performing power transmission and reception to and from substation equipment through an overhead wire to control electrical charging/discharging of a power storage device connected to a load capable of generating regenerative electrical power, stored in a non-transitory computer readable recording medium, to function as:

a peak cut power calculation unit configured to calculate transmission peak cut power that is power transmittable to the overhead wire, the transmission peak cut power being power exhibiting monotonic non-increase with respect to a resistance value of the overhead wire between the vehicle and the substation equipment; and a peak cut unit configured to charge the power storage device with power of a difference between the regenerative electrical power generated by the load and the transmission peak cut power calculated by the peak cut power calculation unit when the regenerative electrical power is equal to or more than the transmission peak cut power, wherein the peak cut power calculation unit is configured to calculate an electrical current by dividing a voltage difference by a resistance value of the overhead wire, the voltage difference being a difference between a maximum pantograph point voltage at which no regeneration cancelation of the load occurs and a voltage applied to a regenerative resistor of the substation equipment, the resistance value of the overhead wire exhibiting monotonic increase with respect to the distance between the vehicle and the substation equipment, and the peak cut power calculation unit is configured to calculate the transmission peak cut power by multiplying the electrical current by the maximum pantograph point voltage at which no regeneration cancelation of the load occurs.

10. A program for causing an electrical charging/discharging controller mounted on a vehicle that runs by performing power transmission and reception to and from substation equipment through an overhead wire to control electrical charging/discharging of a power storage device connected to a load capable of generating regenerative electrical power, stored in a non-transitory computer readable recording medium, to function as:

a peak cut power calculation unit configured to calculate reception peak cut power that is power receivable from the overhead wire, the reception peak cut power being power exhibiting monotonic non-increase with respect to the resistance value of the overhead wire between the vehicle and the substation equipment; and a peak cut unit configured to discharge power of a difference between required power that is required by the load and the reception peak cut power calculated by the peak cut power calculation unit from the power storage device when the required power is equal to or more than the reception peak cut power, wherein the peak cut power calculation unit is configured to calculate an electrical current by dividing a voltage difference by a resistance value of the overhead wire, the voltage difference being a difference between a maximum pantograph point voltage at which no regeneration cancelation of the load occurs and a voltage applied to a regenerative resistor of the substation equipment, the resistance value of the overhead wire exhibiting monotonic increase with respect to the distance between the vehicle and the substation equipment, and the peak cut power calculation unit is configured to calculate the reception peak cut power by multiplying the electrical current by the maximum pantograph point voltage at which no regeneration cancelation of the load occurs.

* * * * *